United States Patent
Lee et al.

(10) Patent No.: US 11,126,517 B2
(45) Date of Patent: Sep. 21, 2021

(54) METHOD AND SYSTEM FOR COMMUNICATION CHANNELS TO MANAGEMENT CONTROLLER

(71) Applicant: QUANTA COMPUTER INC., Taoyuan (TW)

(72) Inventors: Ai-Chin Lee, Taoyuan (TW); Ching-Sui Pan, Taoyuan (TW); Hsin-Wei Chou, Taoyuan (TW); Wei-Tsung Tu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 194 days.

(21) Appl. No.: 16/411,994

(22) Filed: May 14, 2019

(65) Prior Publication Data

US 2020/0364125 A1    Nov. 19, 2020

(51) Int. Cl.
*G06F 11/22* (2006.01)
*G06F 3/06* (2006.01)
*G06F 9/4401* (2018.01)
*G06F 11/14* (2006.01)
*G06F 11/27* (2006.01)

(52) U.S. Cl.
CPC ........ *G06F 11/2284* (2013.01); *G06F 3/0635* (2013.01); *G06F 9/4401* (2013.01); *G06F 11/1417* (2013.01)

(58) Field of Classification Search
CPC .. G06F 11/2284; G06F 3/0635; G06F 9/4401; G06F 11/1417; G06F 11/27; G06F 9/4403
USPC ...................... 710/10, 11, 16, 38, 105; 713/2
See application file for complete search history.

(56) References Cited

U.S. PATENT DOCUMENTS

| | | | |
|---|---|---|---|
| 6,813,648 B1 * | 11/2004 | Perona | G06F 11/2284 710/10 |
| 2006/0168189 A1 * | 7/2006 | Huang | H04L 67/125 709/223 |
| 2007/0055793 A1 * | 3/2007 | Huang | G06F 13/102 710/8 |
| 2008/0028117 A1 * | 1/2008 | Nijhawan | G06F 13/4081 710/302 |

(Continued)

FOREIGN PATENT DOCUMENTS

| | | |
|---|---|---|
| TW | I522919 B | 2/2016 |
| TW | I526824 B | 3/2016 |
| TW | I632462 B | 8/2018 |

OTHER PUBLICATIONS

TW Office Action for Application No. 108123875, dated Mar. 31, 2021, w/ First Office Action Summary.

(Continued)

*Primary Examiner* — Farley Abad
*Assistant Examiner* — Henry W Yu
(74) *Attorney, Agent, or Firm* — Nixon Peabody LLP (57) ABSTRACT

A system and method for providing system data during a power-on routine of a basic input output system. A controller is powered with an independent power source and accesses the system data. A power-on self-test routine is performed via a basic input output system. The fastest available interface of a plurality of interfaces between the basic input output system and the controller is determined. One of the plurality of interfaces is selected. The system data is sent from the controller to the basic input output system via the selected interface during the power-on self-test routine.

19 Claims, 8 Drawing Sheets

(56) References Cited

U.S. PATENT DOCUMENTS

2009/0319637 A1* 12/2009 Wang .................. G06F 11/3006
709/219
2017/0269943 A1* 9/2017 Kumar .................. G06F 9/4411
2020/0349103 A1* 11/2020 Luong .................... G06F 9/4411

OTHER PUBLICATIONS

TW Search Report for Application No. 108123875, dated Mar. 31, 2021, w/ First Office Action.

* cited by examiner

METHOD AND SYSTEM FOR COMMUNICATION CHANNELS TO MANAGEMENT CONTROLLER

TECHNICAL FIELD

The present disclosure relates generally to power-up routines for computing devices. More particularly, aspects of this disclosure relate to a method to insure the availability of system data to a BIOS during a power-up routine.

BACKGROUND

During the power-on self-test (POST) routine for a computer system, such as a processor core on a server, the basic input output system (BIOS) will attempt to obtain relevant system data from an external controller such as a baseboard management controller (BMC). Servers are employed in large numbers for high demand applications such as network based systems or data centers. The emergence of the cloud for computing applications has increased the demand for data centers. Data centers have numerous servers that store data and run applications accessed by remotely connected computer device users. A typical data center has physical chassis structures with attendant power and communication connections. Each rack may hold multiple computing servers and storage servers. Each individual server must be powered up with the POST routine to begin operation. Delays in powering up servers are undesirable, as any delay increases the time a user must wait to complete tasks such as data processing or application execution. Such delays multiplied over the large numbers of servers in a data center can impede overall operation of the data center.

In known systems, during the POST period, the BIOS communicates with a baseboard management controller (BMC), and tries to set or get required system data for management of the system. Such system data may include, for example, field replacement unit (FRU) information, an event log, or system inventory. In current systems, such data is obtained from the BMC via an interface operating according to the Intelligent Platform Management Interface (IPMI) communication protocol. The IPMI protocol and BMC provides general hardware management and inventory functionality regardless of whether the BIOS is powered up. Since the BMC may be very busy during a POST routine, the BIOS often cannot initialize the interface between the BIOS and BMC successfully. In such an instance, the BIOS will consider that the BMC is not functional, and thus the required system data will not be obtained during the POST routine. The lack of required system data may impede the operation of the system.

In addition, in current systems, the BIOS only chooses one interface protocol, such as a keyboard controller style (KCS), to communicate with the BMC. In comparison with other interface protocols, the single KCS interface protocol with the BMC requires a relatively long time period to get the required BIOS data because under KCS, data is transferred byte by byte. Such BIOS data may include FRU data, event log data, and system inventory data. This delay during the POST routine may result in a user believing the system is frozen, and may cause the user to restart the system, rather than waiting for the completion of the POST routine. This causes further delays in making the system operational.

Figure 1:
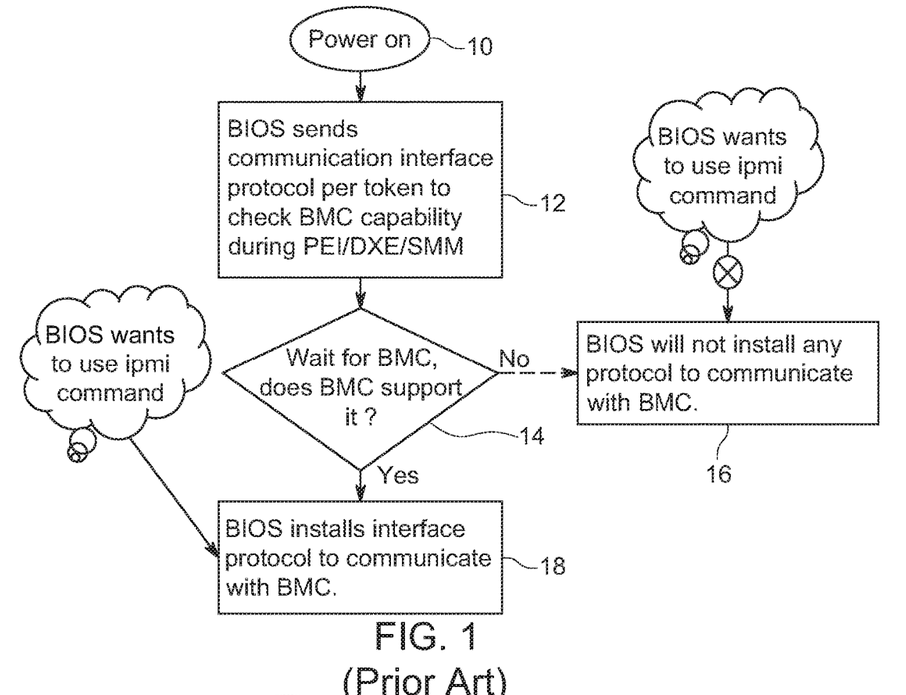
FIG. 1 is a prior art process of a BIOS obtaining data from a BMC through a single interface.

FIG. 1 is an example of a prior art process of a BIOS obtaining data from a BMC through a single interface. FIG. 1 shows when system is powered on (10), the BIOS will begin a power initialization start up routine. This routine includes performing pre-Extensible Firmware Interface (EFI) initialization (PEI), driver execution environment (DXE), and system management mode (SMM) services. The BIOS uses a token to decide which interface to check on the BMC during the PEI/DXE/SMM process in Universal Extensible Firmware Interface (UEFI) based firmware (12). The BIOS then waits for the BMC to determine whether the BMC supports the communication protocol interface (14). If the BMC does not support the interface protocol, the BIOS will not install any interface protocol to communicate with the BMC (16). If the BMC supports the interface protocol, the BIOS will install the interface protocol to communicate with the BMC (18). In current systems, the BIOS can only use one interface protocol, such as keyboard control style (KCS), to communicate with the BMC. As may be seen in FIG. 1, failure to install the interface protocol will deprive the BIOS of the needed system data.

Figure 2:
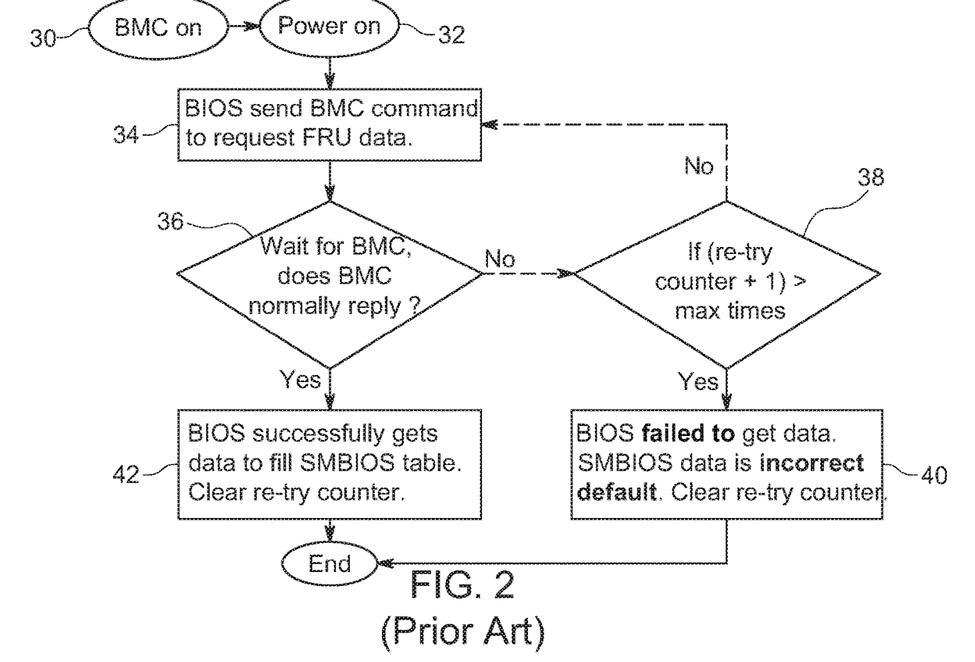
FIG. 2 is a prior art flow diagram of a series of retries that occur when a failed request for FRU data occurs from the BMC.

In addition, in current systems, the BIOS will attempt to retry an IPMI command to obtain data if an initial command fails to communicate with a BMC. FIG. 2 shows such a scenario in current BIOS routines where the BIOS uses an IPMI Command to get field replacement unit (FRU) information from the BMC. In this example process, the BMC is turned on (30). The power to the system is then turned on (32). The BIOS sends the BMC a command to request FRU data (34). The BIOS then waits for the BMC to determine whether the BMC normally replies to the request (36). If there is no response, the BIOS sets a retry counter and determines whether the retries exceeds the maximum retry number, such as three times (38). If the retry counter is less than the maximum, the BIOS cycles back to sending the BMC another command to request the FRU data (34). If the retry counter exceeds the number of maximum times, the BIOS then clears the re-try counter (40) and ends the routine. In this case, the BIOS fails to obtain the system data and the corresponding table in the system management BIOS (SMBIOS) is the incorrect default. If there is a response, the BIOS successfully obtains the system data to fill the SMBIOS table and the retry counter is cleared (42) to end the routine. The retry process is time consuming because of the number of retries that are allowed.

Thus, prior art systems suffer from the BIOS POST time being too long. or the system being stuck during the POST routine due to the amount of data that must be transferred to the BIOS. Alternatively, if the BIOS is unable to get crucial data, such as FRU data, successfully from the BMC because the BMC too busy to respond in time, the system management BIOS (SMBIOS) data will be empty, or the default data already stored. Thus, accurate management data will be unavailable to the system and operation may be impaired.

Thus, there is a need for a system that provide multiple interface options for communication of data during startup from a BMC to the BIOS. There is a further need for a system that provides a fast channel to communicate data from the BMC to the BIOS. There is a further need for a system to bypass obtaining the data from the BMC if the data already is available to the BIOS.

SUMMARY

One disclosed example is a system for providing system data during a power-on routine of a basic input output system. The system includes a controller having an independent power source. The controller is operable to access system data. A basic input output system is operable to perform a power-on self-test routine. The system includes a plurality of interfaces between the basic input output system and the controller. The basic input output system is operable to determine the fastest available interface of the plurality of interfaces to communicate the system data from the controller to the basic input output system during the power on self-test routine.

Another disclosed example is a method of providing system data during a power on self-test routine of a basic input output system. A powered by an independent power source is operable to access system data. A power-on self-test routine is performed via a basic input output system. The fastest available interface of a plurality of interfaces between the basic input output system and the controller is determined. One of the plurality of interfaces is selected. The system data from the controller is sent to the basic input output system via the selected interface during the power on system routine.

Another disclosed example is a server that includes a basic input output system operable to perform a power-on self-test routine when power is applied. The server includes a baseboard management controller having an independent power supply. The baseboard management controller is operable to access system data. An independent management protocol interface bus couples the basic input output system to the baseboard management controller. The system includes a plurality of interface protocols to communicate the system data between the baseboard management controller and the basic input output system. The basic input output system is operable to select one of the plurality of interface protocols for the baseboard management controller to communicate the system data to the basic input output system.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure provides a mechanism to accelerate POST time and avoid communication failures between a BIOS and a BMC. The mechanism therefore avoids delays due to a BMC hang-up occurring during the POST routine. The disclosed system selects the fastest interface from all available interfaces of the Intelligent Platform Management Interface (IPMI) system between the BIOS and the BMC. The system also allows the BIOS to determine if the required system data is already stored. Thus, if the BMC checks the system data and the system data is not modified, then the BIOS can get the system data directly from back up storage without further communication to the BMC. This process reduces POST time significantly. Also if the BMC fails, the BIOS is able to trigger a BMC reset through a hardware pin.

Figure 3A:
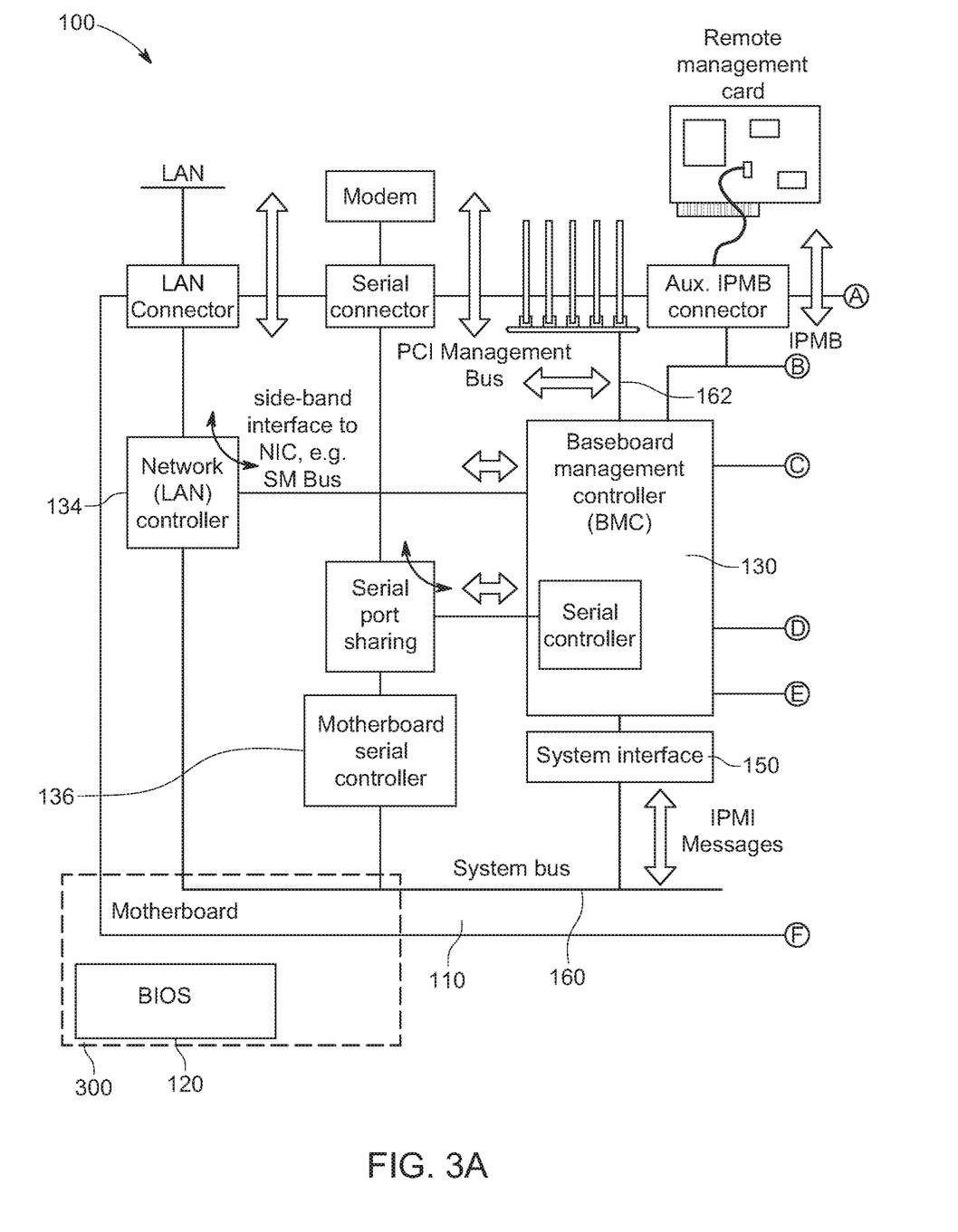
FIG. 3A-3B is a block diagram of an IPMI subsystem that allows multiple interfaces between a BIOS and a BMC.
Figure 3B:
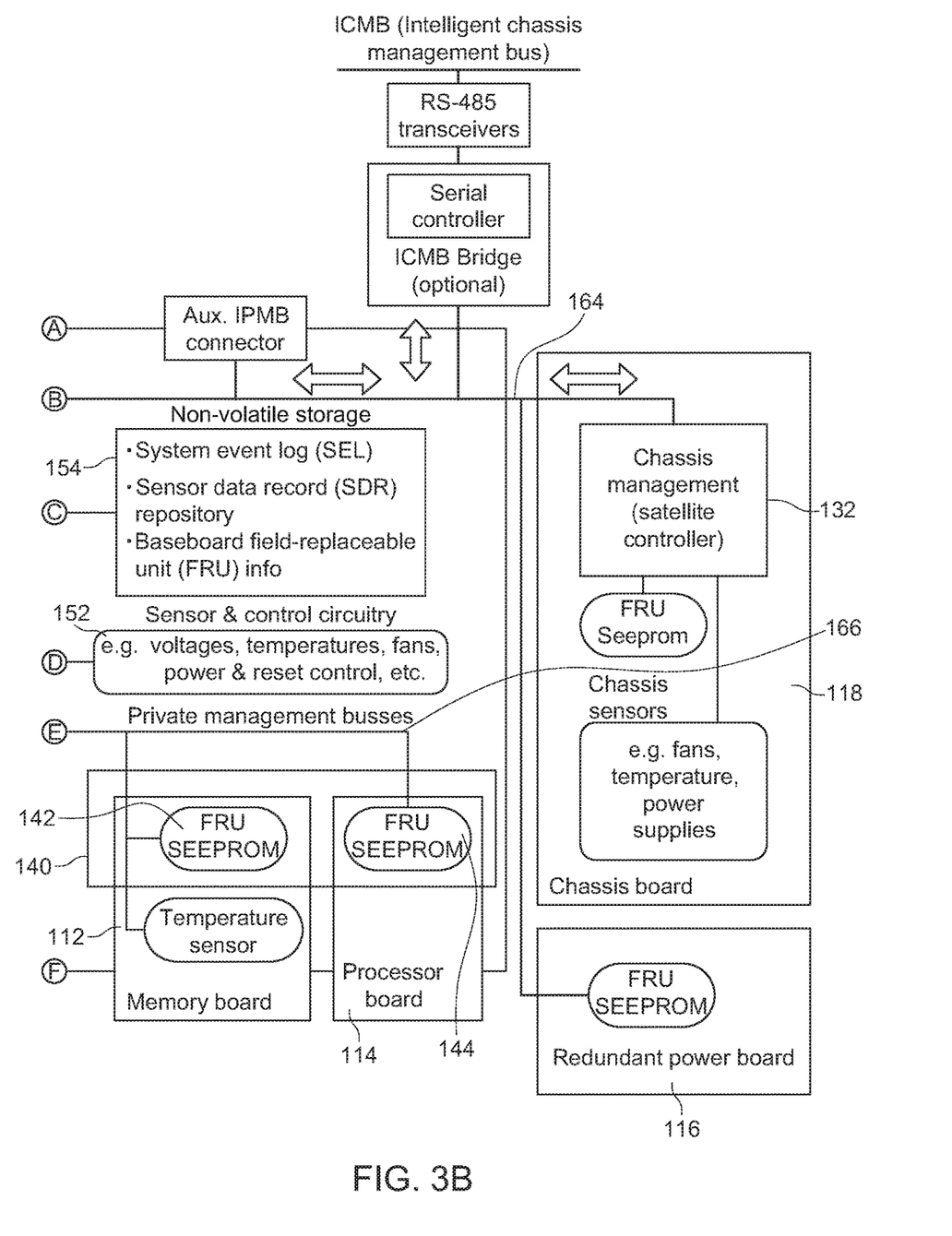

FIG. 3A-3B is a block diagram of an IPMI system 100 that allows the selection of one of multiple communication interface protocols between a BIOS and a BMC to efficiently communicate system data to perform a POST routine. In this example, the IPMI system 100 is part of a server that may include multiple processors and components that are managed by a controller such as a baseboard management controller. The system data may include FRU data, event log data, and system inventory data. The IPMI system 100 includes a motherboard 110, a memory board 112, a processor board 114, a redundant power board 116, and a chassis board 118. The IPMI system 100 allows management of systems to support other components such as a processor system on a processor motherboard 300 that includes a BIOS 120 that may be stored in a platform controller hub (PCH) chip. The motherboard 110 includes a baseboard management controller (BMC) 130 and a field replacement unit (FRU) memory unit 140. The FRU memory unit 140 consists of static memories on the memory board 112 and the processor board 114 that store FRU data for the system 100. The BMC 130 serves as a main controller and may communicate with other satellite management controllers distributed on different modules. For example, the system 100 includes a chassis management controller 132, a network controller 134, and a serial controller 136, each of which communicates with the BMC 130.

The FRU memory unit 140 includes an EEPROM 142 on the memory board 112, and an EEPROM 144 on the processing board 114. The FRU memory unit 140 includes FRU data for all replaceable components in the system 100. The FRU data is stored in the EEPROMs 142 and 144 on the respective boards 112 and 114. The BIOS 120 gathers data for the system event log and the system inventory that is passed to the BMC 130.

The BMC 130 is also connected to an IPMI system interface 150, a series of sensor and control circuits 152, and a non-volatile storage 154. The sensor and control circuits 152 allow monitoring and regulation of system functions through voltage sensors, temperature sensors, fan controls, and power regulation controls. The non-volatile storage 154 stores certain system data such as the results of the system event log, the sensor data record, and other data used by the BMC 130. The BMC 130 manages the system data. Thus, this system data may be accessed even if other processors, such as that associated with the BIOS, fail.

A system bus 160 connects the BIOS 120 to the BMC 130, as well as the network controller 134 and the serial controller 136. A PCI management bus 162 connects the BMC 130 to PCI devices. An Intelligent Platform Management Interface bus (IPMB) 164 connects the BMC 130 to the chassis management controller 132 and the redundant power board 116. A private management bus 166 connects the BMC 130 to the FRU memory unit 140.

Figure 3C:
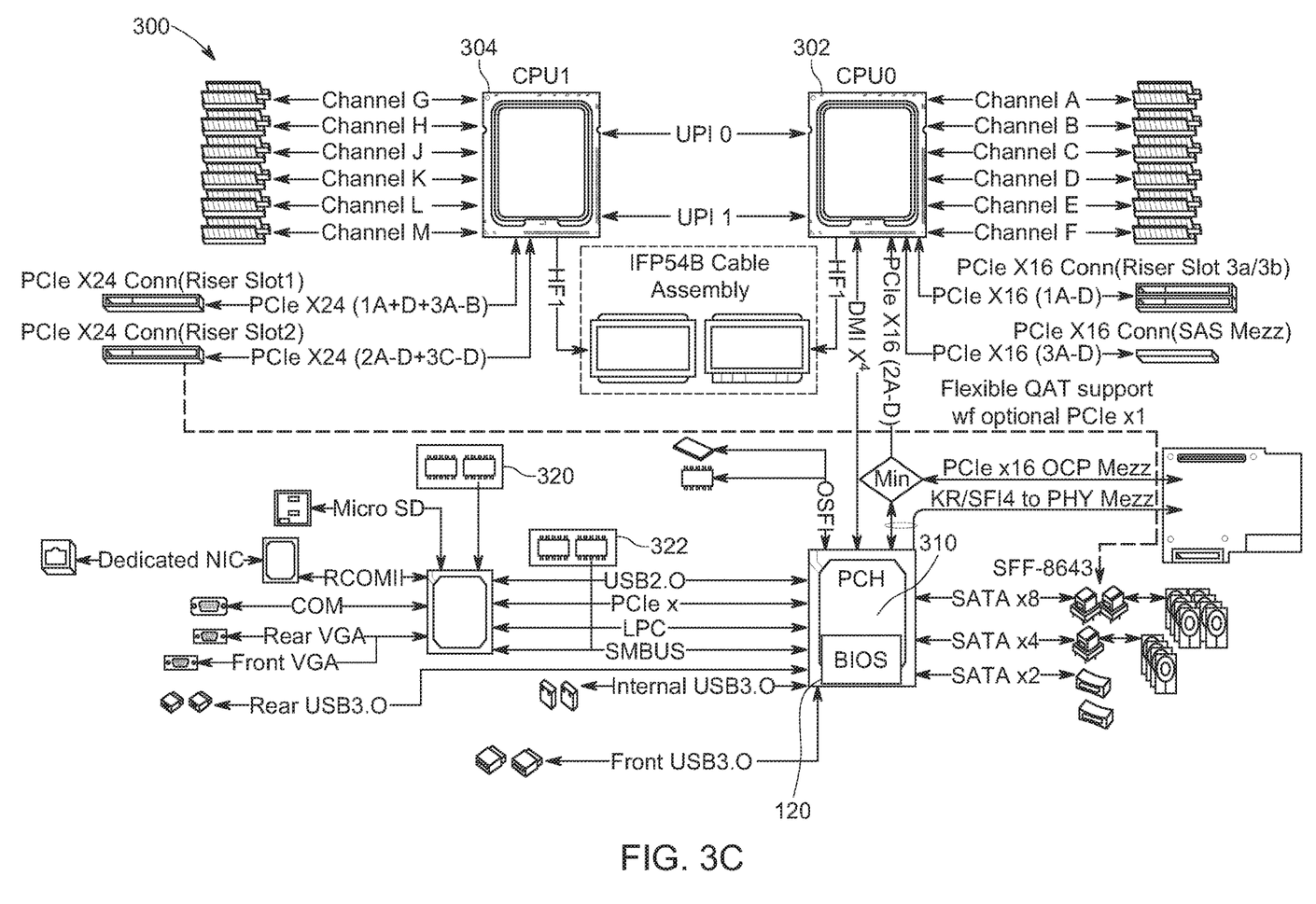
FIG. 3C is a block diagram of a processor motherboard connected to the IPMI subsystem in FIG. 3A-3B with the BIOS.

FIG. 3C shows the processor motherboard 300 that includes processors 302 and 304. The platform control hub (PCH) 310 allows routing of data to the components of the processor motherboard 300. The BIOS 120 is part the PCH 310 in this example. The BMC 130 in FIG. 3A has access to an original storage device 320 that includes both DRAM and flash memory in this example. The BIOS 120 has access to a back-up storage device 322 that includes both DRAM and flash memory in this example.

In the example system 100, the BMC 130 will check the data, such as FRU data, in the original storage device 320, or other system data such as the generated system event log and system inventory, against the system data in the back-up storage 322. If the system data in the back-up storage 322 is the same as the system data managed by the BMC 130, the BMC 130 will communicate to the BIOS 120 that the data stored in the back-up storage 322 is integral and may be used by the BIOS 120. In this case, the BIOS 120 can directly access the data from the back-up storage 322, and there is no need to send a command to ask the BMC 130 for the data.

If the data in the non-volatile memory of the original storage 320 is not the same as the data stored in the back-up storage 322, the BIOS 120 will need to request the data from the BMC 130. In this case, the system will select one of multiple interface protocols to send the system data to the BIOS 120. In the instance when the BMC 130 fails, the BIOS 120 is able to trigger a BMC reset through sending a signal via a hardware pin of the BMC 130 that is connected to a processor chip set. If the reset signal is still not able to wake the BMC 130, the BIOS 120 is still able to get the system data from the flash memory of the back-up storage 322 and does not need to rely on the BMC 130. Alternatively, the BIOS 120 could also display a message indicating that the system data is not available during the POST routine.

The system 100 allows the selection of one several different interfaces to co-work on the communication between the BMC 130 and the BIOS 120. In this example, the interfaces may include the keyboard control style (KCS) interface, the SMBus system interface (SSIF), and the block transfer interface. In this example, the SSIF interface will deal with larger data such as system event log data or system inventory data and therefore is the fastest interface. In this example, the KCS interface may be used for transferring data with small data counts such as self-test results or other simple commands and is therefore slower than the SSIF interface. When the power is turned on, the BIOS 120 will check which interfaces are installed between it and the BMC 130. The BIOS 120 will then choose the fastest interface from the installed interfaces to communicate with BMC 130. After a few retries, if that interface is busy and cannot get a response from the BMC 130, the BIOS 120 will switch to the second fastest interface to communicate with the BMC 130, and continue to try each available different interface to communicate with the BMC 130.

Figure 4:
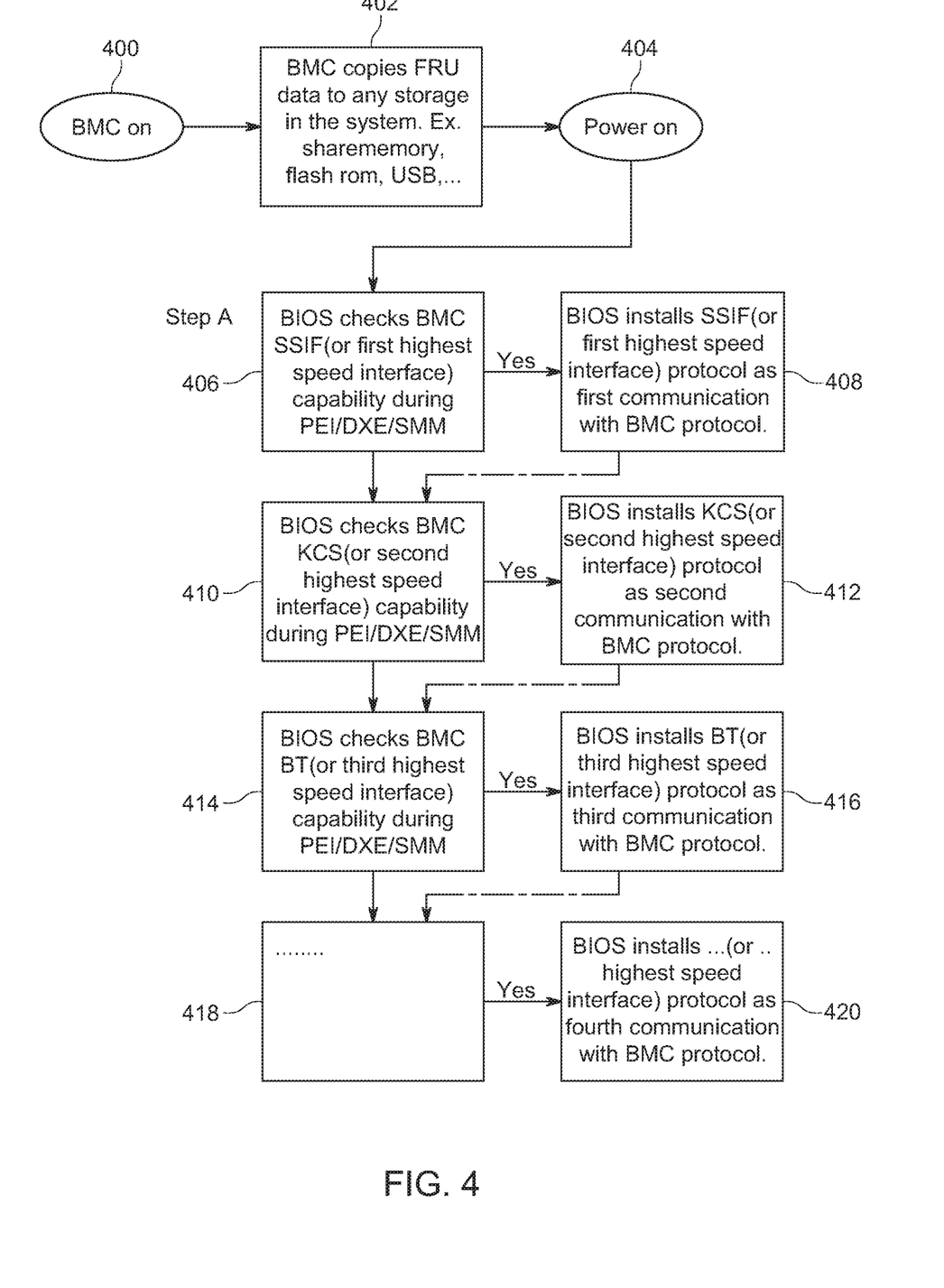
FIG. 4 is a flow diagram of a routine that allows communication between the BIOS and the BMC via multiple interfaces in the example system shown in FIG. 3A-3B.

FIG. 4 is a flow diagram of the process of loading data from the BIOS 120 to the BMC 130 in FIG. 3A-3C. The power is turned on to the BMC 130 (400). The BMC 130 copies accessible the system data to any storage in the system such as the storage 320 and 322 (402). The power is then turned on to the BIOS 120 in FIG. 3A and the power on self-test routine is started (404). The BIOS 120 checks the fastest interface such as the SSIF interface (406). If the fastest interface is available, the BIOS installs the highest speed interface, such as the SSIF interface protocol, to first communicate data from the BMC 130 (408).

The BIOS 120 then checks the second highest speed interface, which in this example, is the KCS interface (410). If the second interface is available, the BIOS 120 installs the second highest speed interface as the second communication interface with the BMC 130 (412).

The BIOS 120 then checks the third highest speed interface, which in this example, is the block transfer (BT) interface (414). If the interface is available, the BIOS 120 installs the third highest speed interface as the third communication interface with the BMC 130 (416).

The BIOS 120 then checks the next highest speed interface (418). If the interface is available, the BIOS 120 installs the next highest speed interface as the next communication interface with the BMC 130 (420).

The process then repeats this procedure to determine other available communications interfaces, and thus use the fastest available communication interface between the BIOS 120 and the BMC 130.

Thus, if the fastest available interface is the SSIF interface, the BMC 130 will communicate data, such as FRU data, to the BIOS 120 through the SSIF interface. If the SSIF interface is unavailable, the BMC 130 will communicate data to the BIOS 120 through the next fastest communication interface. In this example, KCS is the next fastest communication interface.

Figure 5:
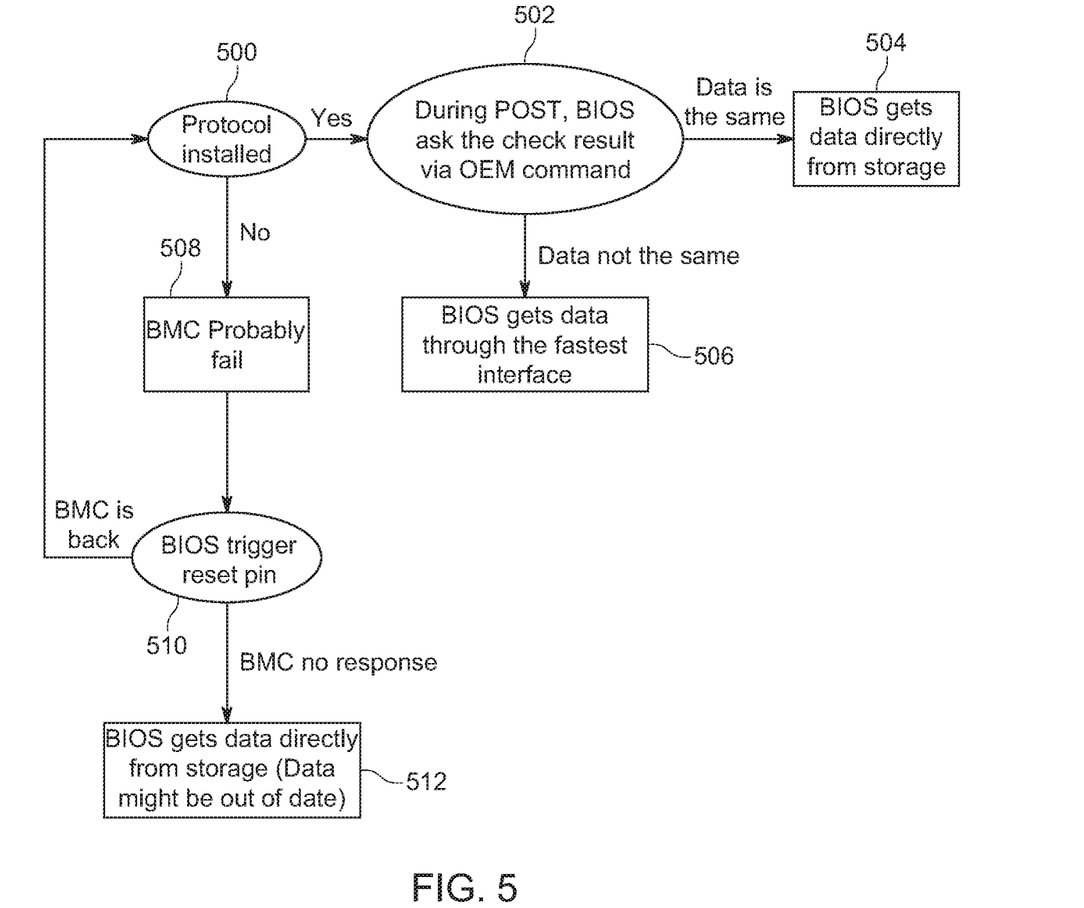
FIG. 5 is a flow diagram of a start-up routine that allows the BIOS to bypass communication with the BMC to obtain needed system data.

FIG. 5 is a flow diagram of the routine to bypass the need to install self-test data from the BMC 130 in FIG. 3A-3B, and determine whether a reset may be needed from BMC failure. The BIOS 120 in FIGS. 3A-3C first determines whether an interface protocol has been successfully installed by the BMC 130 based on the process in FIG. 4 (500). If the interface protocol is successfully installed, during the POST routine, the BIOS 120 will request a check result via a command to the BMC 130. The BMC 130 will determine if the system data in the back-up storage 322 accessed by the BIOS 120 is the same as the system data accessed by the BMC 130 (502). If the data is the same, the BIOS 120 will obtain the system data directly from the back-up storage 322

(504). If the data is not the same (502), the BIOS 120 will obtain the data from the BMC 130 via the fastest available interface as determined in the routine in FIG. 4 (506).

If the interface protocol is not successfully installed (500), the BIOS 120 will determine that the BMC 130 has probably failed (508). The BIOS 120 will then trigger a reset signal on the hardware pin of the BMC 130 (510). If the BMC 130 responds to the reset signal, the BIOS 120 will loop back to determine if the protocol is now successfully installed (500). If the BMC 130 does not respond to the reset signal, the BIOS 120 will obtain the required data directly from the back-up storage 322 (512). In this case, the system data may be out of date because the back-up storage 322 does not have the current system data from the BMC 130.

The flow diagrams in FIGS. 4-5 are representative of example machine readable instructions for the process of streamlining the communication of data required for a BIOS POST routine. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 4-5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 6:
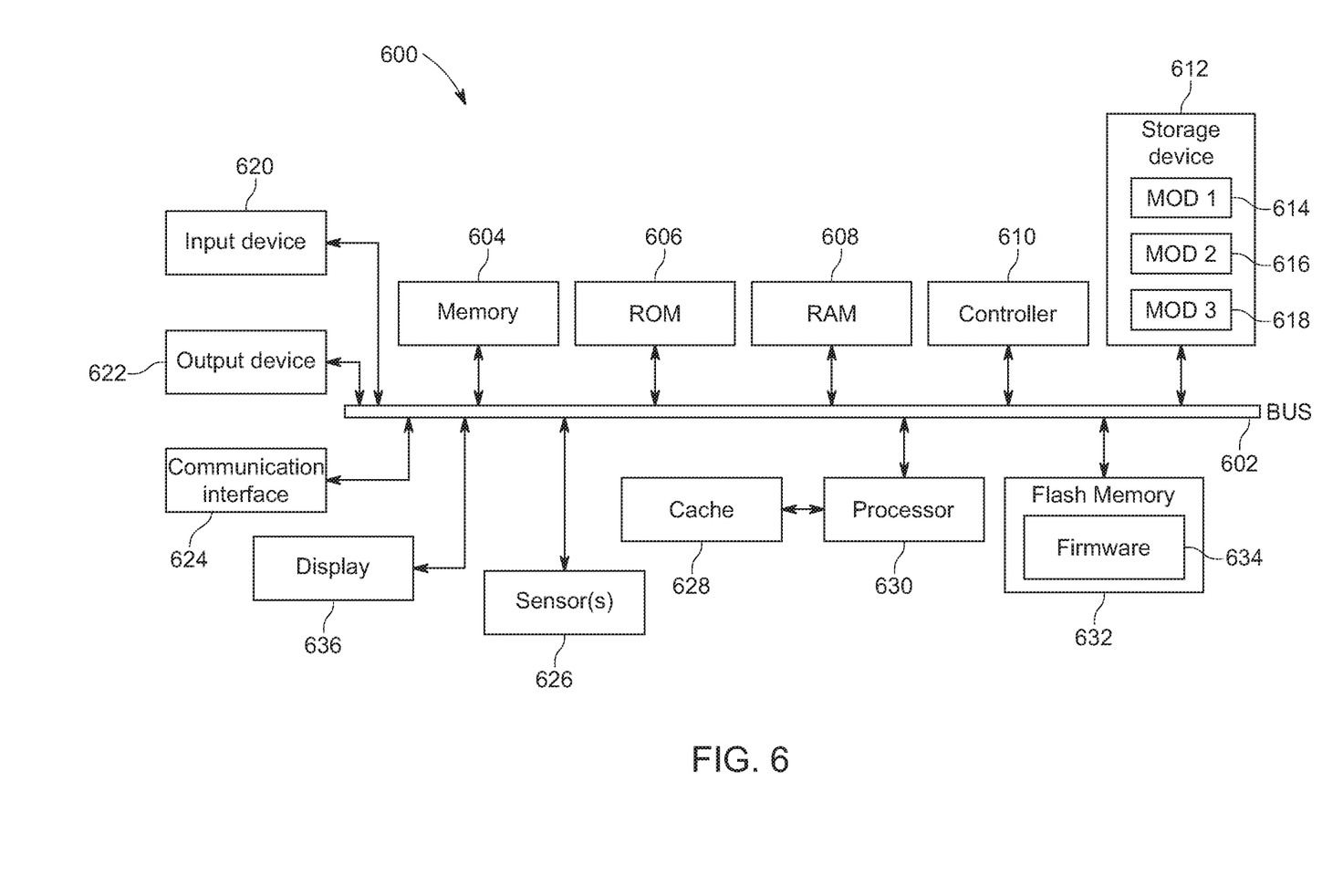
FIGS. 6 and 7 illustrate exemplary computer systems in accordance with various examples of the present disclosure.

FIG. 6 illustrates an example computing system 600, in which the components of the computing system are in electrical communication with each other using a bus 602. The system 600 includes a processing unit (CPU or processor) 630; and a system bus 602 that couples various system components, including the system memory 604 (e.g., read only memory (ROM) 606 and random access memory (RAM) 608), to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for processor 630 while waiting for data. These and other modules can control or be configured to control the processor 630 to perform various actions. Other system memory 604 may be available for use as well. The memory 604 can include multiple different types of memory with different performance characteristics. The processor 630 can include any general purpose processor and a hardware module or software module, such as module 1 614, module 2 616, and module 3 618 embedded in storage device 612. The hardware module or software module is configured to control the processor 630, as well as a special-purpose processor where software instructions are incorporated into the actual processor design. The processor 630 may essentially be a completely self-contained computing system that contains multiple cores or processors, a bus, memory controller, cache, etc. A multi-core processor may be symmetric or asymmetric.

To enable user interaction with the computing device 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the system 600. In this example, an output device 622 is also provided. The communications interface 624 can govern and manage the user input and system output.

Storage device 612 can be a non-volatile memory to store data that is accessible by a computer. The storage device 612 can be magnetic cassettes, flash memory cards, solid state memory devices, digital versatile disks, cartridges, random access memories (RAMs) 608, read only memory (ROM) 606, and hybrids thereof.

The controller 610 can be a specialized microcontroller or processor on the system 600, such as a BMC (baseboard management controller). In some cases, the controller 610 can be part of an Intelligent Platform Management Interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event log controller and/or storage for managing and maintaining events, alerts, and notifications received by the controller 610. For example, the controller 610 or a system event log controller can receive alerts or notifications from one or more devices and components, and maintain the alerts or notifications in a system event log storage component.

Flash memory 632 can be an electronic non-volatile computer storage medium or chip that can be used by the system 600 for storage and/or data transfer. The flash memory 632 can be electrically erased and/or reprogrammed. Flash memory 632 can include EPROM (erasable programmable read-only memory), EEPROM (electrically erasable programmable read-only memory), ROM, NVRAM, or CMOS (complementary metal-oxide semiconductor), for example. The flash memory 632 can store the firmware 634 executed by the system 600 when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 634 can recognize, initialize, and test hardware present in the system 600 based on the set of configurations. The firmware 634 can perform a self-test, such as a POST (Power-On-Self-Test), on the system 600. This self-test can test the functionality of various hardware components such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the system 600 can include a firmware configuration that defines how the firmware 634 controls various hardware components in the system 600. The firmware configuration can determine the order in which the various hardware components in the system 600 are started. The firmware 634 can provide an interface, such as an UEFI, that allows a variety of different parameters to be set. These parameters can be different from parameters in a firmware default configuration. For example, a user (e.g., an administrator) can use the firmware 634 to specify clock and bus speeds; define what peripherals are attached to the system 600; set monitoring of health [e.g., fan speeds and CPU temperature limits]; and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

System 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general purpose output (GPO), and the like. Different types of sensors (e.g., sensors 626) on the system 600 can also report to the controller 610 on parameters, such as cooling fan speeds, power status, operating system (OS) status, hardware status, and so forth. A display 636 may be used by the system 600 to provide graphics related to the applications that are executed by the controller 610.

Figure 7:
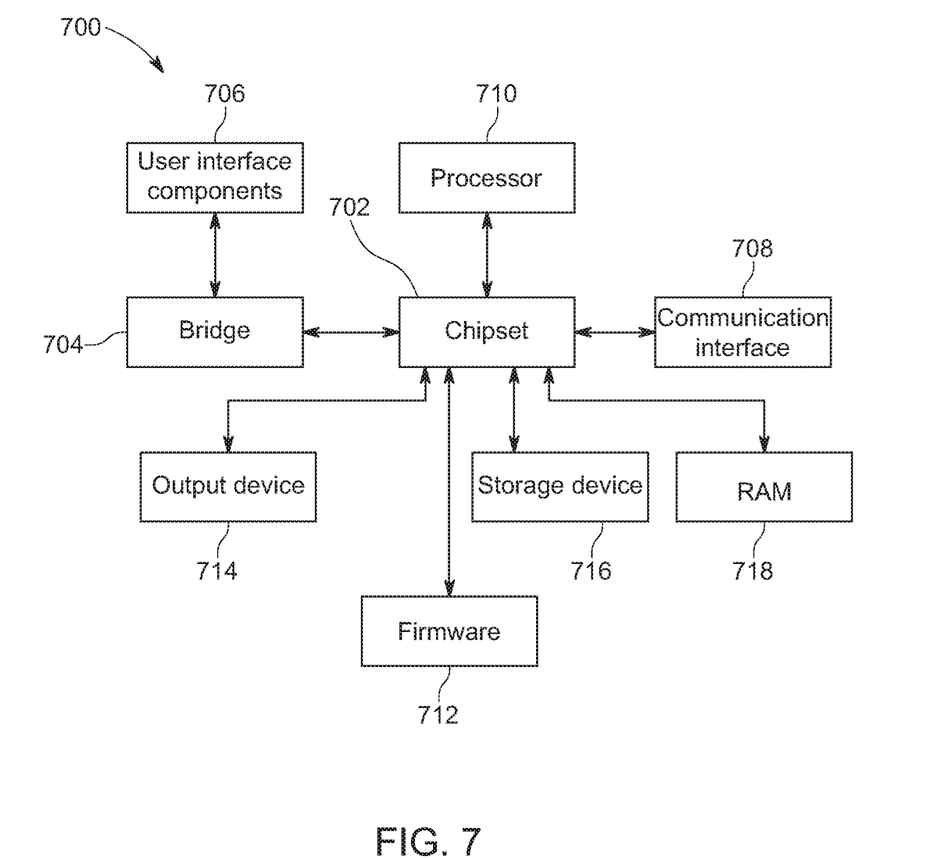

FIG. 7 illustrates an example computer system 700 having a chipset architecture that can be used in executing the described method(s) or operations, and generating and displaying a graphical user interface (GUI). Computer system 700 can include computer hardware, software, and firmware that can be used to implement the disclosed technology. System 700 can include a processor 710 that is representative of a variety of physically and/or logically distinct resources capable of executing software, firmware, and hardware configured to perform identified computations. Processor 710 can communicate with a chipset 702 that can control input to and output from processor 710. In this example, chipset 702 outputs information to output device 714, such as a display, and can read and write information to storage device 716. The storage device 716 can include magnetic media, and solid state media, for example. Chipset 702 can also read data from and write data to RAM 718. A bridge 704 for interfacing with a variety of user interface components 706, can be provided for interfacing with chipset 702. User interface components 706 can include a keyboard, a microphone, touch detection and processing circuitry, and a pointing device, such as a mouse.

Chipset 702 can also interface with one or more communication interfaces 708 that can have different physical interfaces. Such communication interfaces can include interfaces for wired and wireless local area networks, for broadband wireless networks, and for personal area networks. Further, the machine can receive inputs from a user via user interface components 706, and execute appropriate functions, such as browsing functions by interpreting these inputs using processor 710.

Moreover, chipset 702 can also communicate with firmware 712, which can be executed by the computer system 700 when powering on. The firmware 712 can recognize, initialize, and test hardware present in the computer system 700 based on a set of firmware configurations. The firmware 712 can perform a self-test, such as a POST, on the system 700. The self-test can test the functionality of the various hardware components 702-718. The firmware 712 can address and allocate an area in the memory 718 to store an OS. The firmware 712 can load a boot loader and/or OS, and give control of the system 700 to the OS. In some cases, the firmware 712 can communicate with the hardware components 702-710 and 714-718. Here, the firmware 712 can communicate with the hardware components 702-710 and 714-718 through the chipset 702, and/or through one or more other components. In some cases, the firmware 712 can communicate directly with the hardware components 702-710 and 714-718.

It can be appreciated that example systems 600 (in FIG. 6) and 700 can have more than one processor (e.g., 630, 710), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for providing self-test data during a power-on routine of a basic input output system, the system comprising:
   a controller having an independent power source, the controller operable to access system data;
   a basic input output system operable to perform a power-on self-test routine; and
   a plurality of interfaces between the basic input output system and the controller;
   wherein the basic input output system is operable to determine the fastest available interface of the plurality of interfaces to communicate the system data from the controller to the basic input output system during the power on self-test routine.

2. The system of claim 1, wherein the controller is a baseboard management controller.

3. The system of claim 1, wherein the controller is operable to determine if the system data available to the basic input output system is identical to the system data accessed by the controller, and terminate the communication of the self-test data to the basic input output system, if the system data is identical.

4. The system of claim 3, further comprising a back-up storage accessible by the basic input output system, wherein the system-test data is stored on the back-up storage.

5. The system of claim 1, wherein the basic input output system is operable to activate a hardware reset signal to the controller if no communication is available on the plurality of interfaces.

6. The system of claim 1, wherein the basic input output system is further operable to communicate the system data on the second fastest interface of the plurality of interfaces, if the fastest interface is unavailable.

7. The system of claim 1, wherein the plurality of interfaces includes at least one of keyboard control style (KCS), SMBus system interface (SIFF), or block transfer.

8. The system of claim 1, wherein the self-test data includes at least one of field replacement unit data, system inventory data, or system event log data.

9. The system of claim 1, wherein the plurality of interfaces conform to Intelligent Platform Management Interface (IPMI) standards.

10. A method of providing system data during a power-on routine of a basic input output system, the method comprising:
    collecting system data via a controller independently powered;
    performing a power-on self-test routine via a basic input output system;
    determining the fastest available interface of a plurality of interfaces between the basic input output system and the controller;
    selecting one of the plurality of interfaces; and
    sending the system data from the controller to the basic input output system via the selected interface during the power on self-test routine.

11. The method of claim 10, wherein the controller is a baseboard management controller.

12. The method of claim 10, further comprising:
    determining if the system data available to the basic input output system is identical to the system data accessible by the controller; and
    terminating the communication of the system data to the basic input output system, if the system data is identical.

13. The method of claim 12, wherein the system data accessible to the basic input output system is stored on a back-up storage.

14. The method of claim 10, further comprising activating a hardware reset signal to the controller if no communication is available on the plurality of interfaces.

15. The method of claim 10, further comprising communicating the system data on the second fastest interface of the plurality of interfaces, if the fastest interface is unavailable.

16. The method of claim 10, wherein the plurality of interfaces includes at least one of keyboard control style (KCS), SMBus system interface (SIFF), or block transfer.

17. The method of claim 10, wherein the system data includes at least one of field replacement unit data, system inventory data, or system event log data.

18. The method of claim 10, wherein the plurality of interfaces conform to Intelligent Platform Management Interface (IPMI) standards.

19. A server comprising:
    a basic input output system operable to perform a power-on self-test routine when power is applied;
    a baseboard management controller having an independent power supply, the baseboard management controller accessing system data;
    an independent management protocol interface bus coupling the basic input output system to the baseboard management controller; and
    a plurality of interface protocols to communicate the system data between the baseboard management controller and the basic input output system,
    wherein the basic input output system is operable to select the fastest available interface protocol of the plurality of interface protocols for the baseboard management controller to communicate the system data to the basic input output system during the power-on self-test routine.

* * * * *